United States Patent [19]

Campbell et al.

[11] 4,266,362
[45] May 12, 1981

[54] ANIMAL TRAP LOCKING MECHANISM

[76] Inventors: Delmer E. Campbell, 1903 South Ave., Springfield, Mo. 65807; John T. Gargis, 1507 Rocky Ford Rd., Fort Oglethorpe, Ga. 30742

[21] Appl. No.: 90,878

[22] Filed: Nov. 5, 1979

[51] Int. Cl.³ .......................................... A01M 23/08
[52] U.S. Cl. ..................................................... 43/66
[58] Field of Search ...................................... 43/66, 61

[56] References Cited

U.S. PATENT DOCUMENTS

| 147,899 | 2/1874 | Carnahan | 43/66 |
| 186,806 | 1/1877 | Cox | 43/66 |
| 934,469 | 9/1909 | Shoup | 43/66 |
| 1,117,450 | 11/1914 | Schreck | 43/66 |
| 1,546,429 | 7/1925 | Baker | 43/66 |
| 1,606,650 | 11/1926 | McIntyre | 43/66 |
| 1,765,941 | 6/1930 | Sawyer | 43/66 |
| 3,991,508 | 11/1976 | Petrosky | 43/66 |

Primary Examiner—Nicholas P. Godici
Attorney, Agent, or Firm—D. A. N. Chase; Michael Yakimo, Jr.

[57] ABSTRACT

An animal toss trap includes an enclosure having openings for animal entry therethrough. A generally elongated gate displaced from these openings and positioned within the enclosure presents an animal capture compartment therebeyond. In a normal gate position, the horizontally disposed spikes project from one end of the gate towards a wall of the enclosure so as to present a means of entry or path into the animal capture compartment. An animal on initial progression through this path pushes against the spike tips causing the gate to swing in response thereto. During subsequent animal movement the discomfort of the spiked tips upon the side of the animal further urges the animal through the forward path and into the capture compartment. The gate, being spring biased, returns to a normal position after the above animal entry. A lock, released by an animal upon entry into the path is provided to prevent the gate from being opened by a previously captured animal.

4 Claims, 9 Drawing Figures

ANIMAL TRAP LOCKING MECHANISM

BACKGROUND OF THE INVENTION

This invention relates to animal traps and more particularly to an animal toss trap which is functional throughout universal trap positions.

In an animal trap it is desirable to have the capability to toss the trap into inaccessible areas with the assurance that the trap will properly function without regards to the position of the landed trap. Such a universal positioning capability requires the trap to have a capture mechanism therein which can invariably function throughout various trap positions. Known traps, particularly those in use for capturing small rodents, incorporate therein capture mechanism of the spring-loaded and inclined plane or runway type. Both types require proper trap positioning which restricts the tossing capability and manner of trap use. The present invention of the repeating capture type incorporates therein a gate-like structure which properly performs a capture function without restriction to a certain trap position. This capture mechanism can be variously dimensioned and used apart from the toss trap as to be described, so as to be operative in the capture of animals of various sizes.

It is therefore a general object of this invention to provide an animal trap which can be tossed into relatively inaccessible areas with assurance that the landed trap is ready for functional use.

Another important object of the invention is to provide an animal trap, as aforesaid, having a capture mechanism therein unaffected by the relative positioning and tossing of the trap.

Still another object of this invention is to provide an animal trap, as aforesaid, having a capture mechanism therein which urges the animal to proceed into the capture compartment.

A more particular object of the invention is to provide a capture mechanism, as aforesaid, which acts as a gate to control entry into an area for the confinement of animals and which can be variously dimensioned for use with animal enclosures of different sizes.

Still a further object of this invention is to provide a capture mechanism, as aforesaid, which has locking means associated therewith so as to prevent escape of previously captured animals, while still retaining the ability to capture additional animals.

Still another important object of this invention is to provide an animal trap, as aforesaid, which is easy to use, efficient in operation and simple and economical to manufacture.

Other objects and advantages of this invention will become apparent from the following description taken in connection with the accompanying drawings, wherein are set forth by way of illustration and example certain embodiments of this invention.

DESCRIPTION OF THE PREFERRED EMBODIMENT

Figure 1:
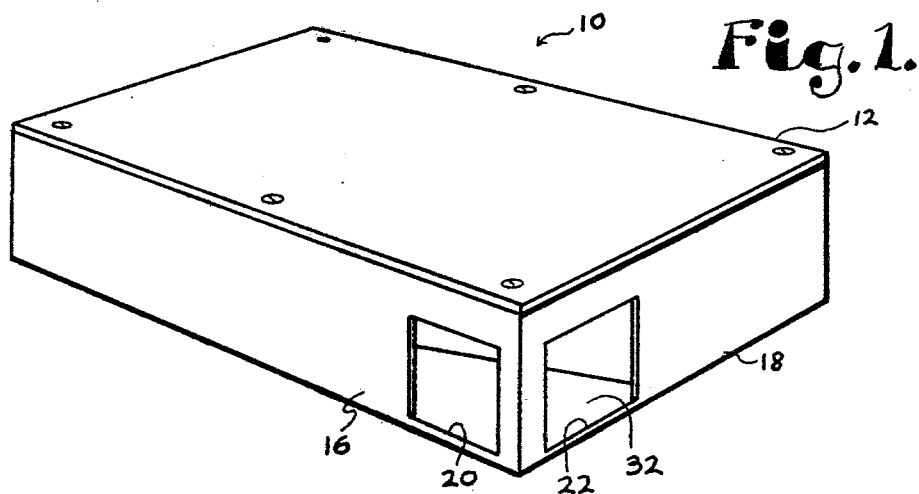
FIG. 1 is a perspective view of the exterior of the animal trap.

Referring more particularly to the drawings, the animal trap 10 generally comprises a rectangular shaped housing 12 with a capture mechanism 14 mounted therein. Near the intersection of the container sidewall 16 and endwall 18 respectively are located openings 20 and 22 for animal entrance therein, such dual openings presenting at least one animal entrance upon any trap position.

Figure 2:
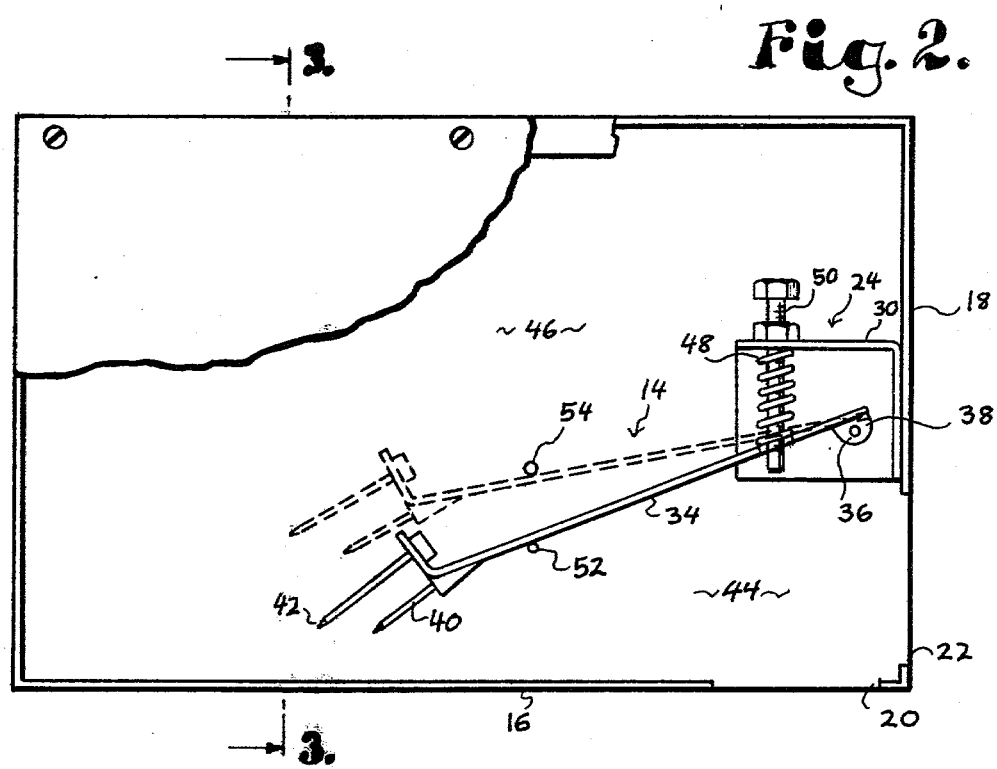
FIG. 2 is a top planar view of the animal trap with the top wall broken away to reveal the capture mechanism or gate mounted therein.
Figure 3:
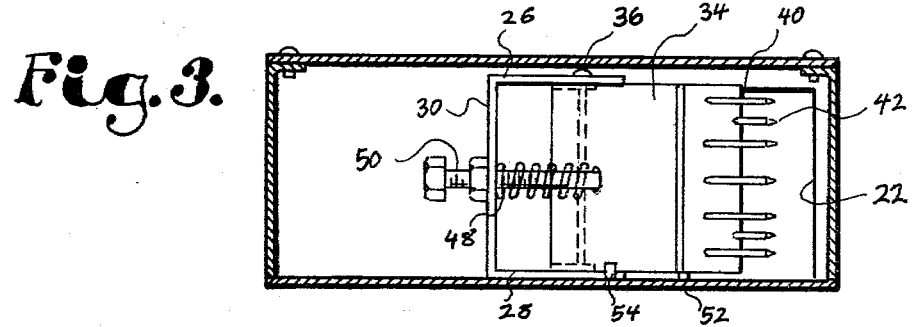
FIG. 3 is a sectional elevational view of the animal trap taken along line 3—3 in FIG. 2.

As shown in FIGS. 2 and 3, the capture mechanism 14 is attached to a bracket 24, comprising planar top and bottom flanges 26 and 28 with a central web 30 therebetween. Although the capture mechanism 14 may be mounted directly to the housing floor 32, it is preferred that the bracket 24 be used for ease and economy of trap manufacture.

The capture mechanism 14 functions as a gate and comprises an elongated barrier or arm member 34 mounted in swinging movement about a pin member 36 vertically disposed through the bracket 24 and flanges 38 extending from one end of the arm 32. Beyond the arm 34 is presented a capture compartment 46 for the confinement of animals therein. The opposed end of the arm 34 is elbowed in configuration with spikes 40 horizontally projecting through the angled portion thereof so as to extend across an entrance or path to the capture compartment 46. If desired, arm 34 could be extended across the path or a plate member (not shown) could be attached at the end thereto in place of spikes 40.

As shown in FIG. 2 the arm 34 is displaced from the entrances 20 and 22 so as to present an entrance area or foyer 44 adjacent those entrances. The spike tips 42 extend towards the sidewall 16 of the housing 12 but it is preferred that they are spaced therefrom so as to present an illusion to the pursued animal of a free path to the capture compartment 46 when the gate 14 is at a normal position. A spring 48 encompasses a guide bolt 50 horizontally extending between the central web 30 and the arm 34 so as to bias the gate 14 towards the normal position. Although a spring 48 has been used to provide the bias it is understood that other means may be used for returning the gate 14 to the normal position.

A front stop post 52 limits such rotation and prevents the gate 14 from swinging through a course (counterclockwise as shown) beyond the desired normal position. A rear stop post 54 located in the capture compartment 46 limits the rotation of the gate 14 through the area of the capture compartment 46 so as to prevent captured animals from being subsequently released.

OPERATION

For purposes of illustration and not limitation, the operation of the trap 10 is explained in reference to a rodent, one of the animals which can be captured therein.

The trap 10 can be tossed into an area of rodent activity with the assurance that at least one of the dual animal entrances 20 or 22 is presented for rodent entrance without regard to the landed trap position. It is understood that the housing 12 can contain two or more capture mechanisms 14 with each mechanism corresponding to separate animal entrances. Upon passage through one of the entrances 20 or 22, and entry into the foyer 44, the rodent has experienced no ill effect, thus the anxiety associated with the unknown is lessened due to the free entry and exit from the housing 12 itself. Also, the curiosity of the rodent is aroused as to what lies beyond the gate 14. The configuration of the elongated arm 34 directs the rodent toward a path communicating with the capture compartment 46 as presented by the spike tip 42/sidewall 16 spatial relationship. This spatial relationship presents an illusion of a relatively free entrance and exit to and from the capture compartment 46 therebeyond. Upon sufficient rodent progression through the path, the rodent pushes against the spikes 40 causing the arm 34 to responsively swing in a clockwise direction away from the normal position. At a point during rodent progression, the spike tips 42 engage a side of the rodent, and as aided by the spring 48 bias, cause discomfort thereto. The clockwise limit of the arm 34, as restricted by the rear stop post 54, prevents the rodent from pushing the arm 32 to such a point that it can turn around and retrace its steps. Also, the spikes 40 are placed at an angle relative to the longitudinal axis of the arm 34 and extend towards the interior of the capture compartment 46 so that the spike tips 42 will more forcefully attempt to penetrate the side of the rodent if the rodent attempts to reverse his movement along the path so as to increase the already initial level of discomfort. Thus, this discomfort urges the rodent into further progression into the capture compartment 46. Upon sufficient progression, the spike tips 42 will disengage from the rodent's side causing the spring biased 48 arm 34 to swing back to the normal position, thus confining the rodent in the capture compartment 46. The arm 34, acting as a barrier, is of such a height that the rodent cannot escape by crawling over the top. During subsequent rodent capture, the clockwise rotation of the arm 34 as limited by the rear stop post 54, prevents previously captured rodents from escaping from the capture compartment 46 while a subsequent rodent is proceeding therein.

It can be seen that the gate 14 functions without restriction as to the trap position. Also, the gate 14 itself may be used to provide access to fenced-off areas, and need not be restricted to use with a housing 12. This adaptability allows for the trapping of various sized animals, the size of the gate 14 and enclosed area depending on the size of the pursued animal.

Figure 4:
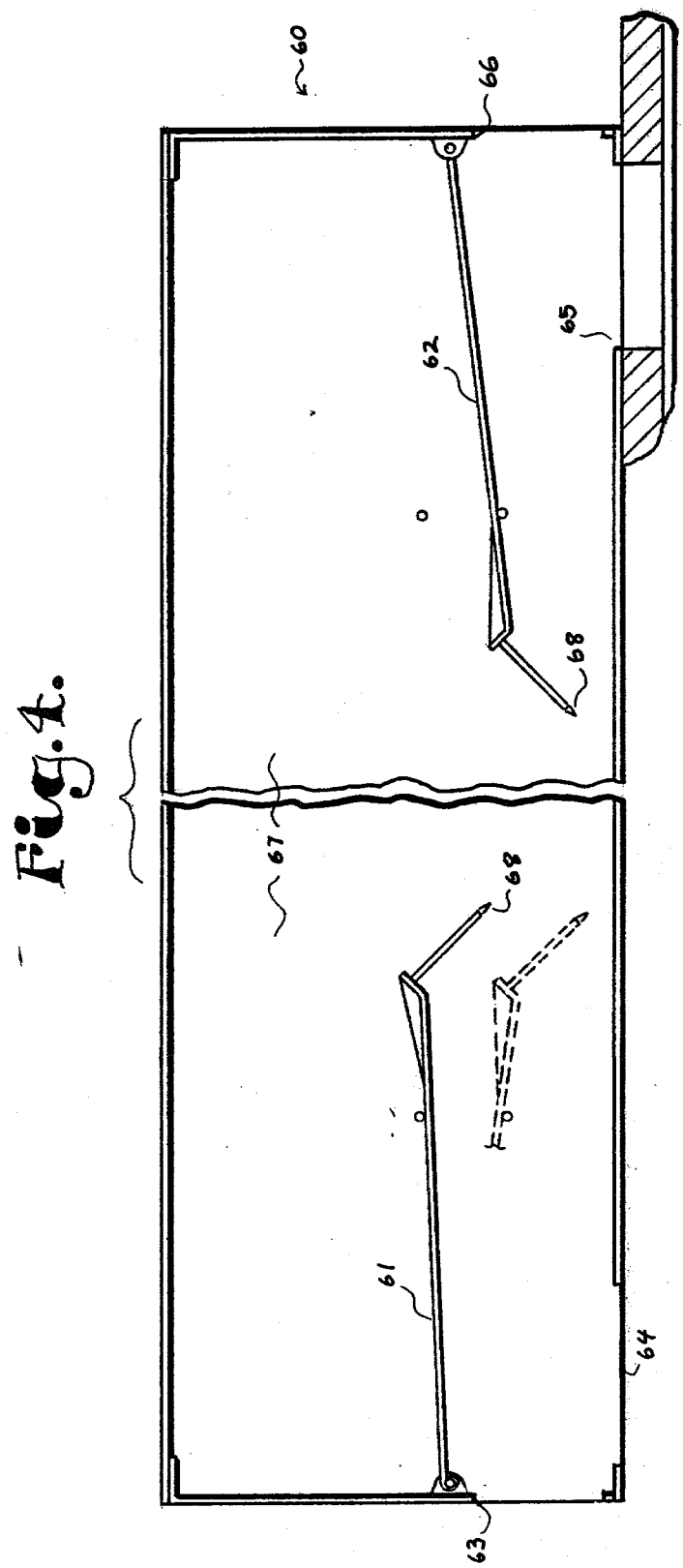
FIG. 4 is a sectional elevational view of an alternative embodiment of the animal trap showing the capture mechanisms or gates mounted therein.

Another embodiment 60 as shown in FIG. 4 uses a gravity reset for the gates 61 and 62 presenting a common capture compartment 67. The gates are identical to the gate 14, except that the spring member 48 is not included therein. The trap 60, lacking such a spring bias must be positioned so that the gates 61 and 62 swing through a vertical course. Entrances 63, 64, 65 and 66 make the trap 60 suitable for placement in narrow passageways such as between walls which serve as runways to various rodents. Each gate 61 and 62 works as described above, although forward progression therethrough is primarily urged by the inability of the animal to back up against the spike tips 68 upon sufficient progression into the capture compartment 26. Upon entry into the capture compartment 67 the gate 61 or 62 returns to the normal position by a gravity reset.

Figure 9:
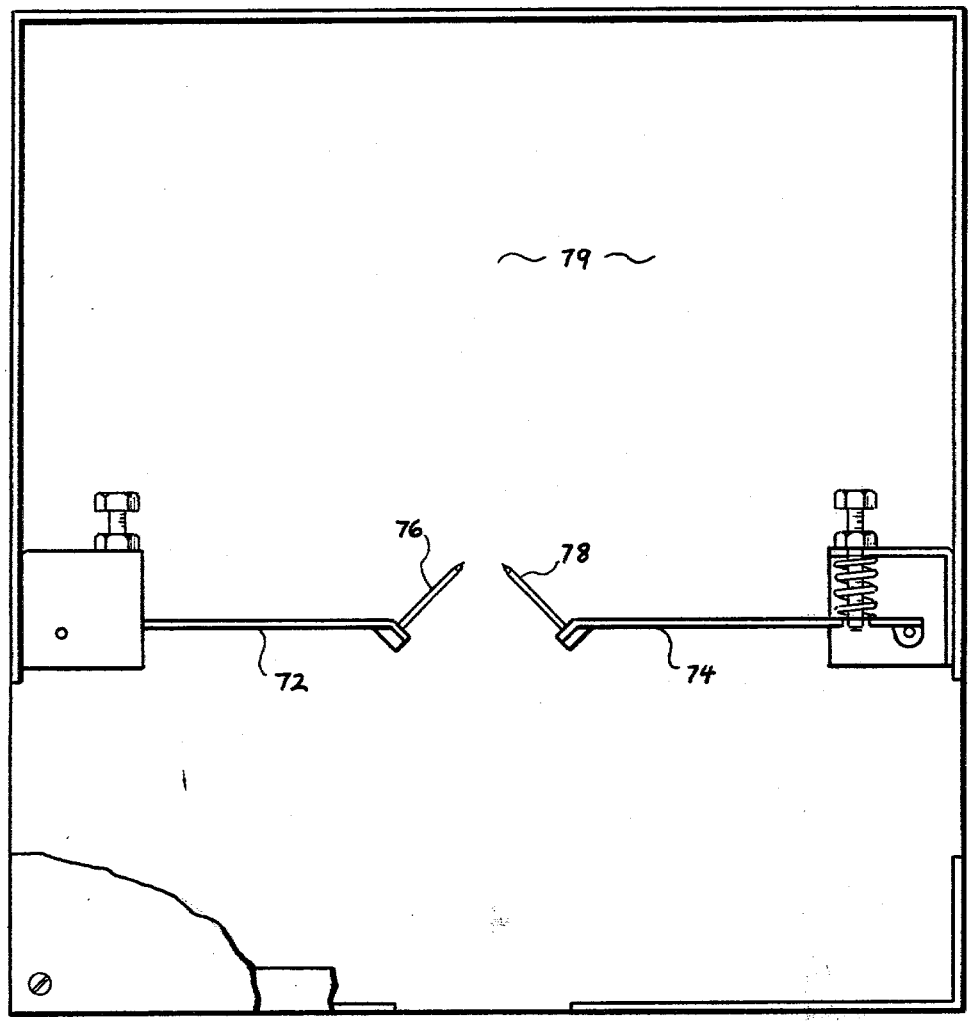
FIG. 9 is a top planar view of another embodiment of the animal trap with the top wall broken away to reveal two capture mechanisms or gates therein.

Another embodiment 70 as shown in FIG. 9 uses a pair of capture mechanism 72 or 74 disposed one towards the other. The respective spike tips 76 and 78 are positioned so as to present therebetween an entrance or path into the animal capture compartment 79. Upon animal progression therethrough the respective spike tips 76 and 78 contact an adjacent side of the rodent and thereafter function as above described.

Although the housing 12 may be formed from sheet metal, etc., it is preferred that the housing 12 and/or the gate 14 of the above embodiments 10, 60 and 70 be made of a light admitting material such as a plexiglass, plastic or the like. The light effect results in more desirable conditions for entry into the housing 12 as it presents a feeling of openness to the rodent, and thus, tends to alleviate the fear that rodents have of entering unfamiliar and enclosed places.

Additionally, it has been found that some species of rodents are of sufficient intelligence and/or dexterity to open the gate 14 while confined in the capture compartment 46 by various means of exertion against the spikes 40. Therefore, means have been designed to lock the gate 14 in a normal position so as to be non-responsive to exertion against the spikes 40 by previously captured rodents.

Figure 5:
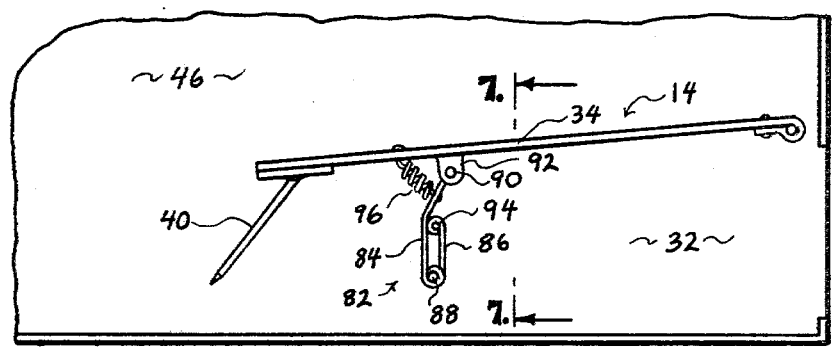
FIG. 5 is a fragmentary top planar view of the animal trap showing an alternative configuration of the capture mechanism or gate in a normal locked position.
Figure 6:
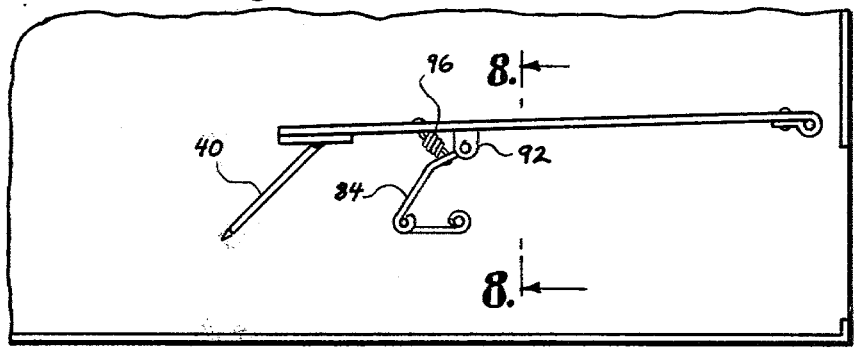
FIG. 6 is a view as shown in FIG. 5 showing the capture mechanism or gate in an unlocked position.
Figure 7:
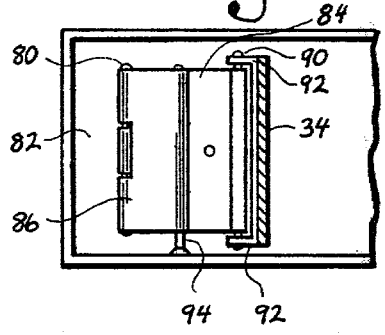
FIG. 7 is a fragmentary elevational view of the locking mechanism used in conjunction with the gate shown in FIG. 5 and taken along line 7—7 in FIG. 5.
Figure 8:
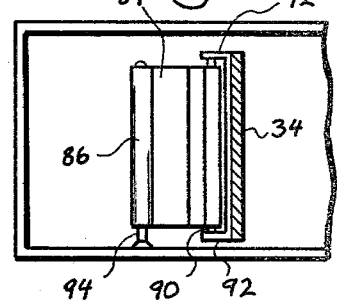
FIG. 8 is a fragmentary elevational view of the locking mechanism along line 8—8 in FIG. 6.

As shown in FIGS. 5 and 6 the locking means 80 comprises a hinge member 82 having first 84 and second leaf 86 members mounted about a common hinge pin 88. The free end of the first leaf 84 is pivotally mounted to the arm 34 of the gate 14 by means of a pin member 90 passing through a flange 92 projecting from the arm 34. The free end of the second leaf 86 is pivotally attached to a fixed pin member 94 which is mounted to the floor 32 of the housing so as to allow a swingable motion of the hinge concurrent with the motion of the swinging gate 14.

An imaginary axis is passed through the pivot point provided by the pin member 90 on the arm 34 and the pivot point provided by the pin member 94. When the gate 14 is in a normal position the hinge pin 88 will lie along this axis or as shown in FIG. 5 to a side or over-center position relative to this axis contra the opening direction of the swinging gate. At this position since the hinge pin 88 is in alignment with this imaginary axis or in an over-center position relative thereto, as shown in FIG. 5, the hinge 82 is in a locked position. Thus, pressure exerted at the spikes 40 will not elicit a swingable response from the gate 14. However, the hinge pin 88 must be placed in a position so that an uncaptured rodent will brush this hinge pin 88 before or during progression into the capture compartment 46. Upon brushing this hinge pin 88, the pin 88 moves into a releasable position, as shown in FIG. 6, i.e., out of alignment with the above imaginary axis or out of the "over-center" position so that the swinging motion of the hinge 82 is again available in concurrence with the swinging motion of the gate 14. Thus the gate 14 will now be responsive to exertion by an animal against the spike member 40.

As shown the first leaf 84 is of an elbowed configuration having first and second legs so as to allow the hinge pin 88 to easily progress to the over-center position to lock the hinge 82 movement. Also, a spring 96 can now be moved to a position between the first leaf member 84 and the arm 34 so as to urge the hinge 82 and the gate 14 back into the normal but now locked position.

The locking mechanism 80 can be placed along the extent of the arm 34 according to the degree of hinge 88 tension desired and the size of the pursued rodent.

Having then described the invention, what is claimed as new and desired to be secured by Letters Patent is:

1. For use in an animal trap having a housing with a swingable gate therein for controlling access to an animal capture area, said gate being swingable from a normal closure position in response to animal exertion thereagainst, means for locking said gate at said normal position comprising:
   a hinge assembly including first and second leaves with each leaf having first and second ends, said respective first ends pivotally mounted about a common hinge pin;
   means mounted to said gate for pivotally mounting said second end of said first leaf thereto;
   means fixed to said housing and spaced from said gate for pivotally mounting said second leaf thereto so as to provide a swinging motion to said hinge accompanying said gate movement;
   an imaginary axis passing through said gate pivot and said housing pivot; and
   said hinge pin positioned relative to said axis at said normal gate position so as to prevent said hinge motion whereby said attached gate is non-responsive to said exertion of said animal.

2. The animal trap as claimed in claim 1, wherein said hinge pin is responsive to a force provided by said animal brushing thereagainst, said force moving said hinge pin to a point spaced from said axis so as to permit said hinge motion whereby said attached gate is responsive to said exertion of said animal.

3. The animal trap as claimed in claim 1, wherein said first leaf is of an elbowed configuration having first and second legs therein with said second leg pivotally mounted to said gate, said elbowed first leaf directing said hinge pin to an over-center position beyond said axis at said normal gate position.

4. The animal trap as claimed in claim 3, wherein said gate is spring biased with said spring mounted between said second leg and said gate.

* * * * *